(12) United States Patent
Cho et al.

(10) Patent No.: US 7,982,719 B2
(45) Date of Patent: Jul. 19, 2011

(54) FAULT-TOLERANT METHOD, APPARATUS, AND MEDIUM FOR TOUCH SENSOR

(75) Inventors: Seong-il Cho, Seoul (KR); Joon-ah Park, Seoul (KR); Wook Chang, Seoul (KR); Byung-seok Soh, Suwon-si (KR); Yeun-bae Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1064 days.

(21) Appl. No.: 11/802,410

(22) Filed: May 22, 2007

(65) Prior Publication Data

US 2007/0279397 A1 Dec. 6, 2007

(30) Foreign Application Priority Data

May 30, 2006 (KR) .................. 10-2006-0048983

(51) Int. Cl.
*G06F 3/041* (2006.01)
(52) U.S. Cl. ...................... 345/173; 345/156
(58) Field of Classification Search ........... 345/156–173
See application file for complete search history.

(56) References Cited

U.S. PATENT DOCUMENTS

| | | | | |
|---|---|---|---|---|
| 5,543,588 A * | 8/1996 | Bisset et al. | | 178/18.06 |
| 6,927,384 B2 * | 8/2005 | Reime et al. | | 250/221 |
| 7,002,557 B2 * | 2/2006 | Iizuka et al. | | 345/173 |
| 7,190,356 B2 * | 3/2007 | Lin et al. | | 345/173 |
| 2003/0142081 A1 * | 7/2003 | Iizuka et al. | | 345/173 |
| 2005/0046621 A1 * | 3/2005 | Kaikuranta | | 345/173 |
| 2006/0022959 A1 * | 2/2006 | Geaghan | | 345/173 |
| 2007/0296709 A1 * | 12/2007 | GuangHai | | 345/173 |
| 2008/0001926 A1 * | 1/2008 | XiaoPing et al. | | 345/173 |

FOREIGN PATENT DOCUMENTS

| | | |
|---|---|---|
| JP | 10-269021 | 10/1998 |
| JP | 11-102274 | 4/1999 |
| JP | 2003-196031 | 7/2003 |
| KR | 2000-0052152 | 8/2000 |
| KR | 10-2005-0065943 | 6/2005 |

OTHER PUBLICATIONS

Office Action issued in corresponding Korean Patent Application No. 10-2006-0048983, on Sep. 27, 2007.

* cited by examiner

*Primary Examiner* — Nitin Patel
(74) *Attorney, Agent, or Firm* — Staas & Halsey LLP

(57) ABSTRACT

A fault-tolerant method, apparatus, and medium for a touch sensor is disclosed. The fault-tolerant apparatus for a touch sensor includes a plurality of sensor pads composed of outer sensor pads and an inner sensor pad to receive an input of operation signals, a clustering unit detecting signals by clustering the sensor pads according to the input signals, and an operation mode judgment unit judging an operation mode through the detected signals and removing a signal noise and an inter-signal interference.

25 Claims, 13 Drawing Sheets

| | 1101 | 1102 | 1103 | 1104 |
|---|---|---|---|---|
| DRAG-IN FAILURE RATE | 12/90 | 5/90 | 21/90 | 8/90 |
| DRAG-OUT FAILURE RATE | 7/90 | 7/90 | 11/90 | 9/90 |

FAULT-TOLERANT METHOD, APPARATUS, AND MEDIUM FOR TOUCH SENSOR

CROSS-REFERENCE TO RELATED APPLICATIONS

This application claims the benefit of Korean Patent Application No. 10-2006-0048983 filed on May 30, 2006 in the Korean Intellectual Property Office, the disclosure of which is incorporated herein by reference in its entirety.

BACKGROUND OF THE INVENTION

1. Field of the Invention

The present invention relates to a fault-tolerant method, apparatus, and medium for a touch sensor and, more particularly, to a fault-tolerant method, apparatus, and medium for a touch sensor that can remove a signal noise and interference between operation modes in order to minimize faults and to perform judgment that approximates a user's intention in a user interface based on the touch sensor.

2. Description of the Related Art

Generally, switches for use in home electronic appliances or liquid crystal display (LCD) monitors have been changed from an existing press switch type to a touch switch type.

A touch switch includes an electrode installed inside a front cover of an appliance. If a user touches the electrode part with his/her finger, it senses a change of capacitance induced between the electrode and the user, and transfers a sensed signal to a microprocessor or a microcomputer as a switch signal.

Such a touch switch senses a change of capacitance induced between a pre-installed electrode and a user's finger touching the electrode, a change of inductance, or a change of impedance.

A touch sensor that senses the change of capacitance reacts not only to a touch with a human's finger but also to a touch with any other human part or conductor. Thus, it is possible that a user interface (UI) system having the touch sensor causes occurrence of faults.

In addition, in the case where sensors are densely arranged, inter-signal interference may occur between adjacent detection parts of the sensors due to a hand shadow effect and so on, irrespective of the user's intention, and this causes system faults to occur.

In order to prevent such faults of a touch user interface (UI) system, many devices using the conventional touch sensors intend to perform fault tolerance by securing wide intervals among touch sensors. However, if the number of touch sensors is increased, or an operation mode is extended to a scroll up/down mode, a drag-in/out mode, a long-touch drag-in/out, and others, the possibility of fault occurrence due to the inter-signal interference becomes greater since the space for the touch sensors is limited.

In particular, in the case of a touch play pool (TPP) to which a UI design that detects an operation mode using the time difference between adjacent sensor signals in order to intuit the use of touch sensors, the above-described problem becomes greater. In order to solve this problem, a new method or system is required for an optimum design of a sensor pattern, a removal of a signal noise or inter-signal interference, and a judgment algorithm performing compensation even if a signal that does not belong to a normal operation mode is inputted.

SUMMARY OF THE INVENTION

The present invention solves the above-mentioned problems occurring in the prior art. The present invention maximizes the difference in detection time between adjacent sensor signals in judging an operation mode through a fault-tolerant method, apparatus, and medium for a touch sensor.

The present invention minimizes the influence of a signal noise in judging the operation mode.

The present invention extracts an operation mode that approximates a user's intention, even in the case of a signal region that does not belong to a normal operation mode.

Additional aspects, features and/or advantages of the invention will be set forth in part in the description which follows and, in part, will be apparent from the description, or may be learned by practice of the invention.

In an aspect of the present invention, there is provided a fault-tolerant apparatus for a touch sensor. The apparatus includes a plurality of sensor pads composed of outer sensor pads and an inner sensor pad to receive an input of operation signals, a clustering unit detecting signals by clustering the sensor pads according to the input signals, an operation mode judgment unit judging an operation mode through the detected signals and removing a signal noise and an inter-signal interference, and a signal-based processing unit executing the operation mode intended by a user through the noise-removed signal.

In another aspect of the present invention, there is provided a fault-tolerant method for a touch sensor. The method includes a signal input step of receiving an input of an operation signals to a plurality of sensor pads composed of outer sensor pads and an inner sensor pad, a clustering step of detecting signals by clustering the sensor pads according to the input signals, an operation mode judgment step of judging an operation mode through the detected signals and removing a signal noise and an inter-signal interference, and a signal-based processing step of executing the operation mode intended by a user through the noise-removed signal.

In another aspect of the present invention, there is provided a fault-tolerant apparatus for a touch sensor, including a plurality of sensor pads including outer sensor pads and an inner sensor pad to receive an input of time differential operation signals; a clustering unit which detects signals by clustering the sensor pads according to the time differential operation signals; and an operation mode judgment unit which judges operation modes through the detected signals and removing a signal noise and an inter-signal interference.

In another aspect of the present invention, there is provided a fault-tolerant method for a touch sensor, including (a) receiving input signals from a plurality of sensor pads including outer sensor pads and an inner sensor pad; (b) detecting signals by clustering the sensor pads according to the input signals; and (c) judging operation modes through the detected signals and removing a signal noise and an inter-signal interference.

In another aspect of the present invention, there is provided a fault-tolerant apparatus for a touch sensor, including a clustering unit which detects signals by clustering sensor pads according to time differential operation signals input through the sensor pads; and an operation mode judgment unit which judges operation modes through the detected signals and removing a signal noise and an inter-signal interference from the detected signals.

In another aspect of the present invention, there is provided a fault-tolerant method for a touch sensor, including detecting signals by clustering sensor pads according to time differential operation signals input through the sensor pads; and judging operation modes through the detected signals and removing a signal noise and an inter-signal interference from the detected signals.

According to another aspect of the present invention, there is provided at least one computer readable medium storing computer readable instructions to implement methods of the present invention.

DETAILED DESCRIPTION OF THE PREFERRED EMBODIMENTS

Figure 1:
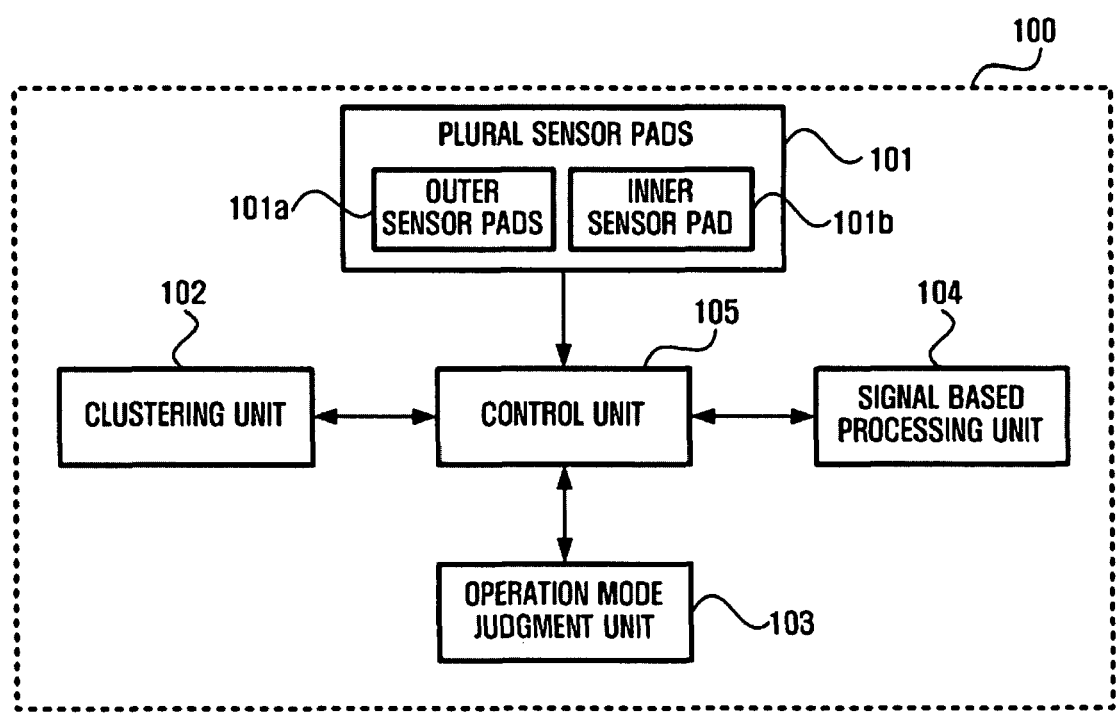
FIG. 1 is a block diagram illustrating the construction of a fault-tolerant apparatus for a touch sensor according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

The present invention will be described herein with reference to the accompanying drawings illustrating block diagrams and flowcharts for explaining a fault-tolerant method and apparatus for a touch sensor according to exemplary embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, implement the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 1 is a block diagram illustrating the construction of a fault-tolerant apparatus for a touch sensor according to an exemplary embodiment of the present invention.

The fault-tolerant apparatus for a touch sensor according to an exemplary embodiment of the present invention includes a plurality of sensor pads 101 including outer sensor pads 101a and inner sensor pad 101b to receive an operation signal, a clustering unit 102 detecting the signal by clustering the sensor pads according to the input signal, an operation mode judgment unit 103 judging an operation mode through the detected signal and removing a noise of the signal and an inter-signal interference, a signal-based processing unit 104 executing the operation mode intended by a user through the noise-removed signal, and a control unit 105 controlling the respective units.

In exemplary embodiments of the present invention, the term "unit", as used herein, denotes, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components may be combined into fewer components or further separated into additional components.

Figure 2A:
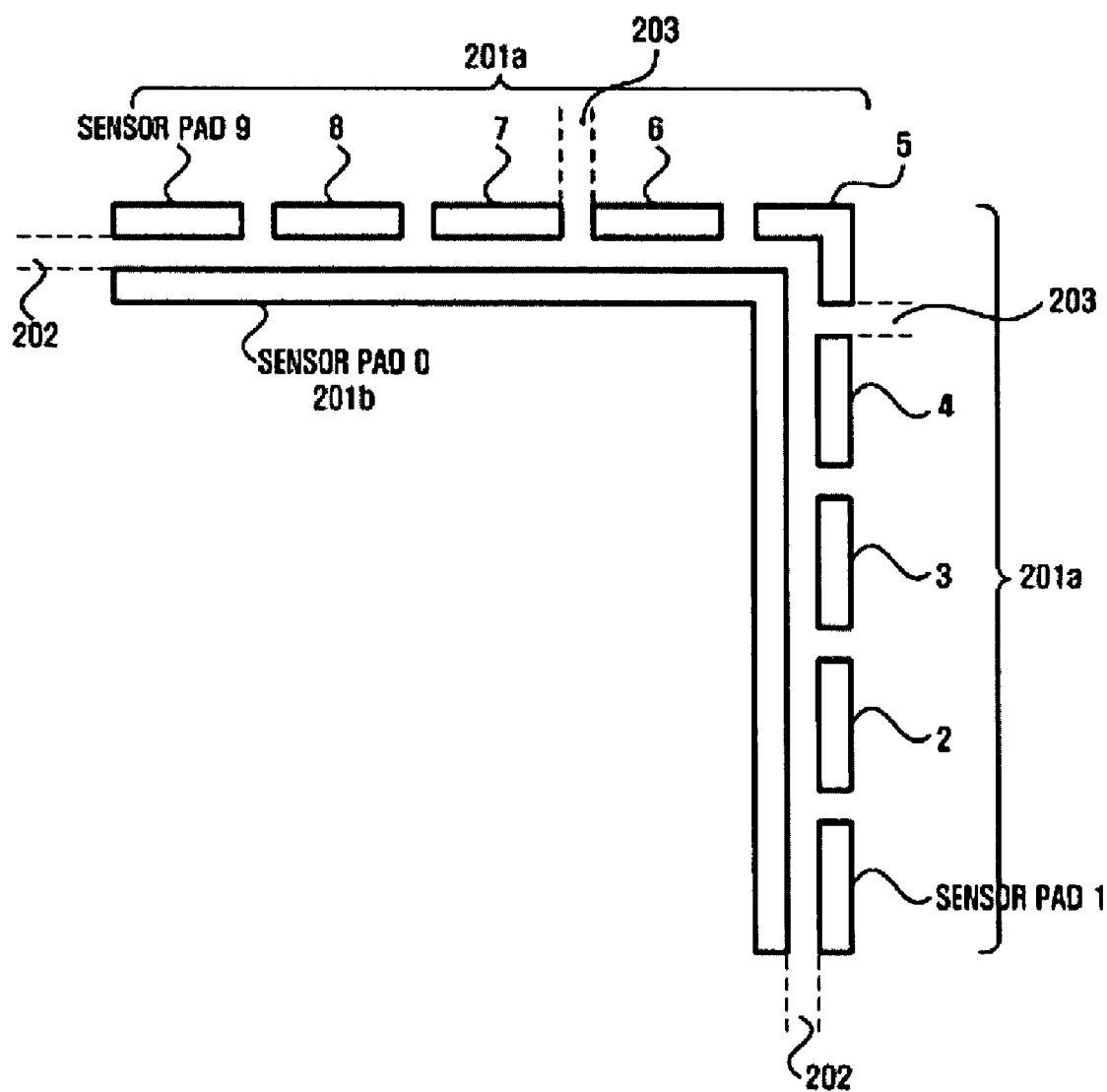
FIGS. 2A and 2B are views illustrating an example of sensor pads as illustrated in FIG. 1 and an example of a touch play pool (TPP) including the sensor pads according to an exemplary embodiment of the present invention.
Figure 2B:
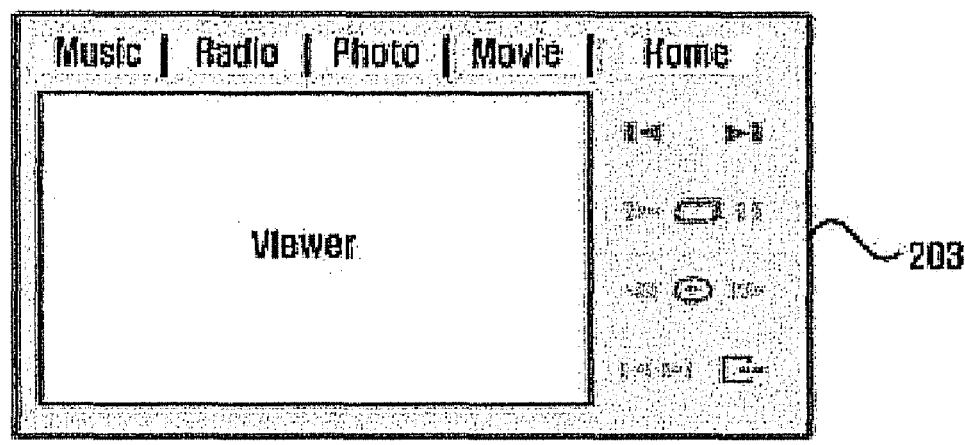
Figure 2B:
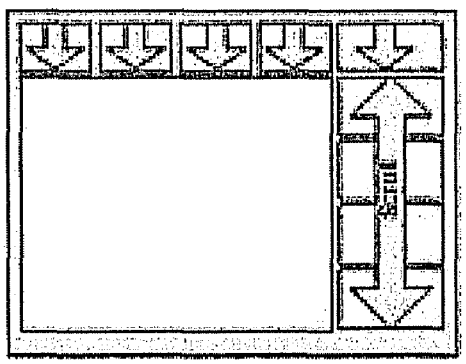
Figure 2B:
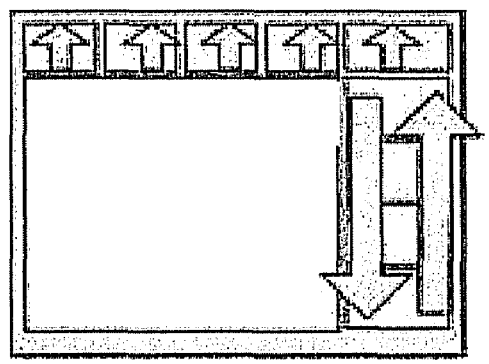
Figure 2B:
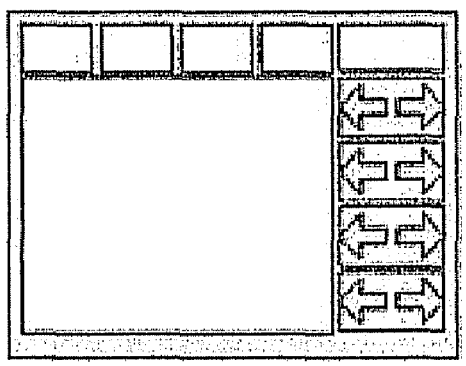
Figure 2B:
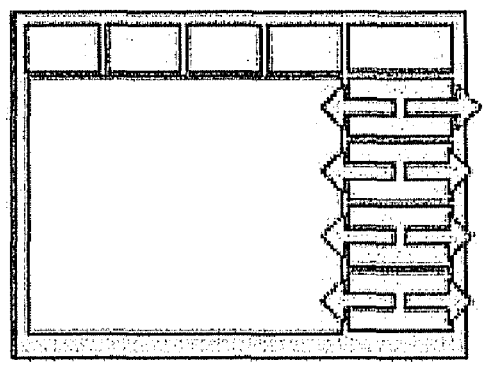

FIGS. 2A and 2B are views illustrating an example of sensor pads 101 as illustrated in FIG. 1 and an example of a touch play pool (TPP) including the sensor pads 101 according to an exemplary embodiment of the present invention.

Sensor pads 101 include outer sensor pads 101a and inner sensor pads 101b. The outer sensor pads 101a are arranged at a predetermined interval 203 to receive an input of time differential operation signals in a horizontal direction.

The inner sensor pad 101b is arranged at a predetermined interval 202 from the outer sensor pads 101a to receive an input of time differential operation signals in a vertical direction.

A user can make an icon be executed by an intuitive action that drags a user's finger onto a screen using the plurality of sensor pads 101, and perform diverse operation modes such as a scroll up/down, a drag in/out, and a long-touch drag in/out.

The clustering unit 102 detects the signal by clustering the arranged sensor pads according to a specified reference.

Here, the specified reference is determined in consideration of all the following three conditions: ① the number of arranged sensor pads, ② the sum of intensities of digital signals outputted from sensor pads, and ③ the sum of the number of sensor pads and the number of intensities of the digital signals.

For example, in the case where two fingers touch the sensor pads arranged in a line, the sensor pads touched by the fingers are tied to produce a group, and if the sum of the intensities of the signals generated from the sensor pads exceeds a predetermined intensity, a cluster can be produced with respect to the group.

If it is assumed that m clusters are produced in the above-described manner, the respective clusters are $c1(t)$, $c2(t)$, $c3(t)$, . . . , and $cm(t)$, and the i-th cluster $c1(t)$ among the m clusters may be composed of one or more sensor pads.

That is, in order to solve the vagueness occurring when two or more fingers touch the sensor pads, the clustering unit 102 serves to tie adjacent sensor pads among a plurality of sensor pads 101 to produce a group of the adjacent sensor pads.

The operation mode judgment unit 103 detects the operation mode through the signal detected by the clustering unit 102, and removes the signal noise and inter-signal interference.

In an exemplary embodiment of the present invention shown in FIGS. 1 through 3B, the operation modes detected by the operation mode judgment unit 103 include a scroll mode, a drag mode, and a long-touch drag mode. The scroll mode refers to a movement in a direction crossing the outer sensor pads 301a, the drag mode refers to a movement between the outer sensor pads 301a and the inner sensor pad 301b, and the long-touch drag mode refers to a case where the on-time of the sensor pad in the drag mode exceeds a predetermined reference time.

Hereinafter, a mode judgment method performed by the operation mode judgment unit 10 and a noise-removing and fault-tolerant method in respective modes will be explained in detail with reference to FIGS. 3 to 10.

Figure 3A:
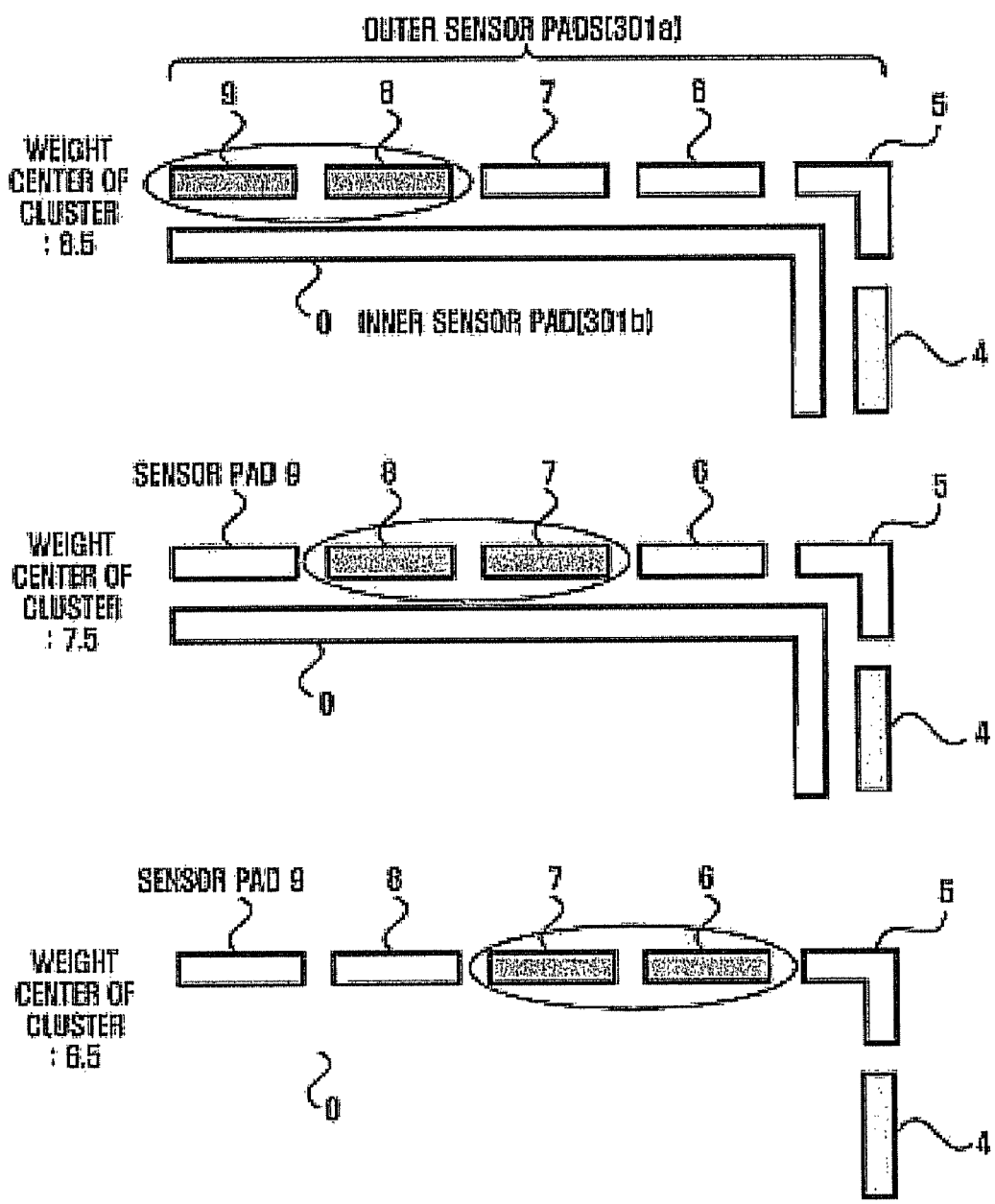
FIGS. 3A and 3B are views illustrating a change of a weight center movement in process of time in a scroll mode according to an exemplary embodiment of the present invention.
Figure 3B:
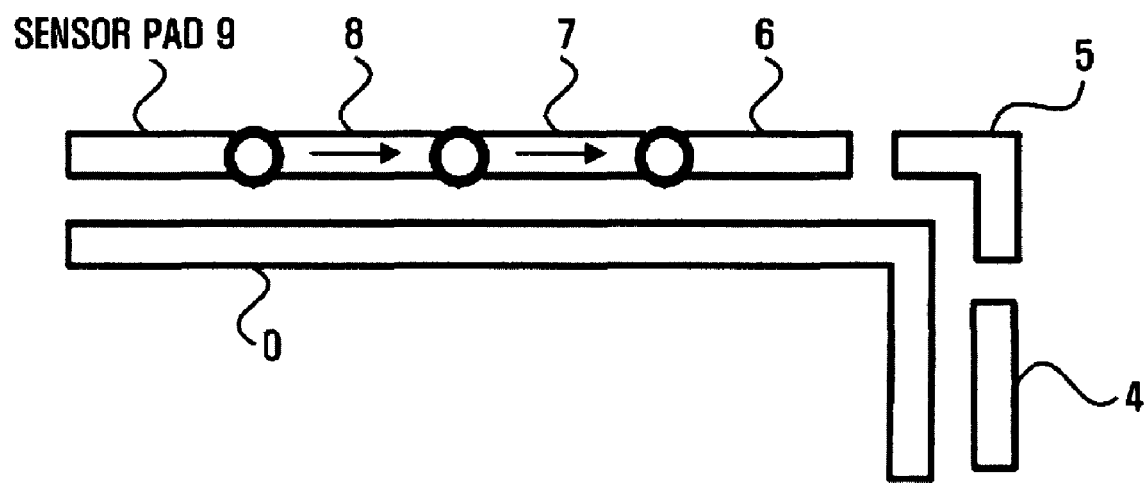

FIGS. 3A and 3B are views illustrating a change of a weight center movement in process of time in a scroll mode according to an exemplary embodiment of the present invention.

The operation mode judgment unit 103 detects the scroll mode by detecting the change of the weight center movement of the sensor pads clustered after being touch, i.e., the change of the cluster.

In order to perform noise removal and fault tolerance in the scroll mode, the minimum value and the maximum value of the change of the weight center movement of the cluster, an initial value for entering into the scroll mode, and an operation value for maintaining the scroll mode are determined, and only in the case where the corresponding value is within the range of the above-described values, the present mode is judged as a normal scroll operation mode. For reference, the minimum value can be the same as the initial value.

For example, if it is assumed that the minimum value (i.e., initial value) is 1.5, the maximum value is 3, and the operation value is 0.5, the scroll operation mode can be achieved only when the changed value of the weight center movement is 1.5 or larger than 1.5. However, the operation mode judgment unit 103 does not recognize the corresponding signal s as the scroll operation mode if the changed value of the weight center movement exceeds 3.

In this case, the operation value of 0.5 denotes the minimum value for detecting the scroll operation after the apparatus enters into the scroll operation mode in accordance with the signal detected by the clustering unit 102. As the operation value becomes smaller, the operation mode judgment unit 103 detects the scroll operation more sensitively, while as the operation value becomes larger, the operation mode judgment unit 103 reacts on the scroll operation less sensitively.

If it is assumed that the change of the weight center movement of the clustered sensor pad is $\Delta G$, the minimum value is $Min(s)$, and the maximum value is $Max(s)$, the relation among them can be expressed by $Min(s) < |\Delta G| < Max(s)$. In judging left/right scroll, the left scroll can be expressed by $Min(s) \leq \Delta G \leq Max(s)$, and the right scroll can be expressed by $-Max(s) \leq \Delta G \leq -Min(s)$.

FIG. 3A illustrates the change of the touch sensor pads in process of time, and FIG. 3B illustrates the movement of the weight center in process of time.

As described above, by tuning the minimum value (i.e., initial value), the maximum value, and the operation value related to the scroll operation mode, the noise removal and the fault tolerance for the scroll mode can be performed.

Figure 4:
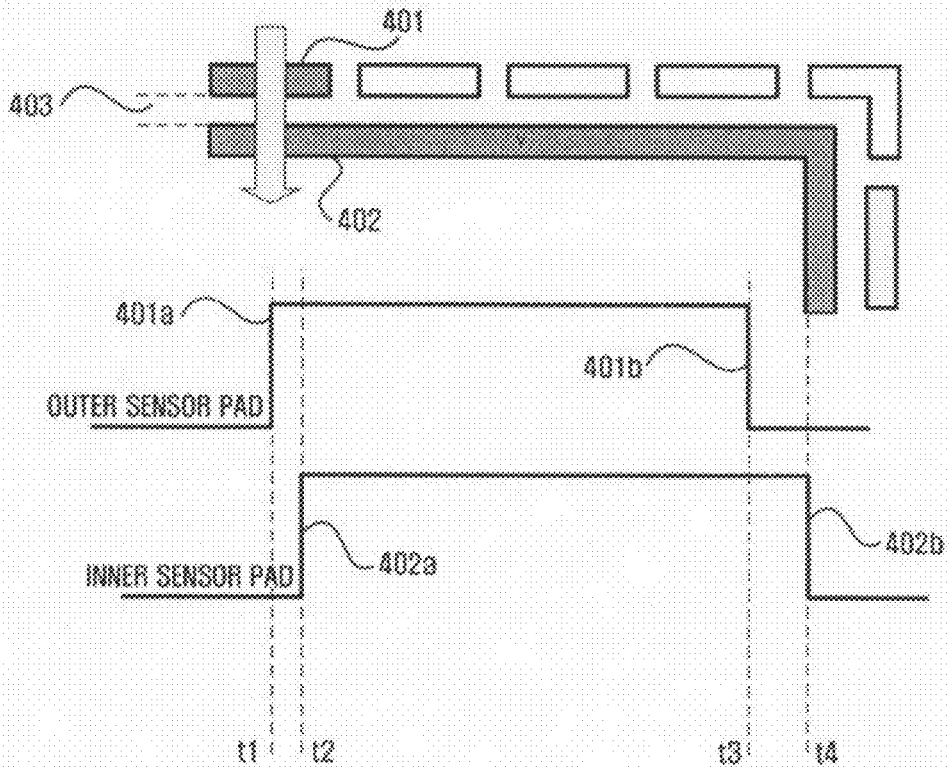
FIG. 4 is a view explaining a drag operation mode according to an exemplary embodiment of the present invention.
Figure 4:
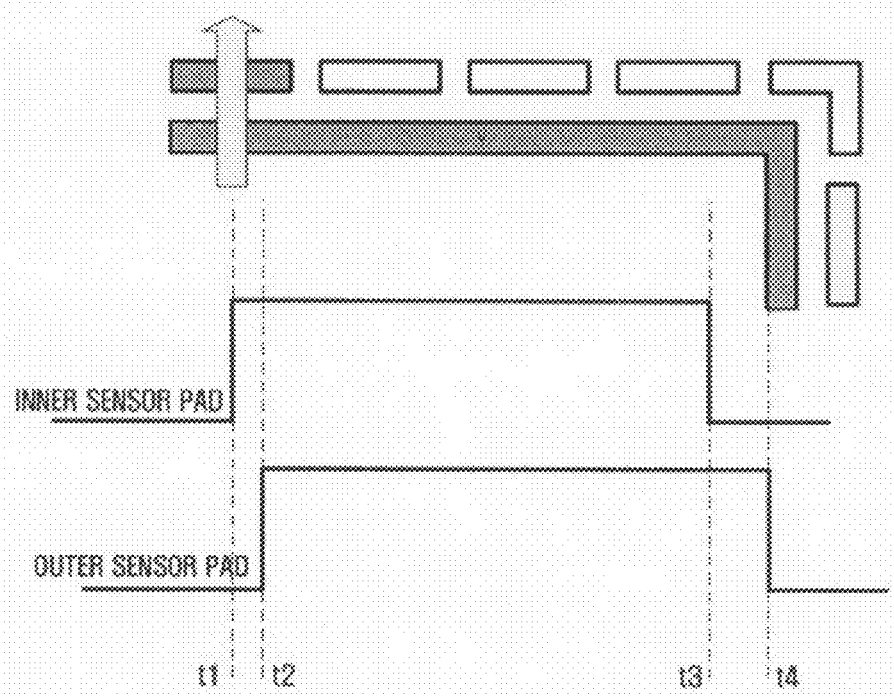

FIG. 4 is a view explaining a drag operation mode according to an exemplary embodiment of the present invention.

In order to receive an input of time differential operation signals in a vertical direction, an inner sensor pad 402 is arranged at a predetermined interval 403 from an outer sensor pad 401, and the operation mode judgment unit 103 detects a drag mode among operation modes by detecting the difference in touch time between the outer sensor pad 401 and the inner sensor pad 402.

More specifically, the orders of positive edges 401a and 402a and negative edges 401b and 402b of the outer sensor pad 401 and the inner sensor pad 402 are detected. If the signal of the inner sensor pad 402 is earlier than that of the outer sensor pad 401, it is judged as the drag out. If the signal of the outer sensor pad 401 is earlier than that of the inner sensor pad 402, it is judged as the drag in.

In order to perform noise removal and fault tolerance in the drag mode, the minimum value and the maximum value of the sensor pads clustered by the clustering unit 102, i.e., of the size of the cluster, are determined, and only in the case where the corresponding value is within the range of the above-described values, the present mode is judged as a normal drag operation mode.

For example, if the size of the cluster exceeds 2 on the assumption that the minimum value is 1 and the maximum value is 2, the corresponding signal is not recognized as the drag operation mode, but is recognized as a signal noise.

In the case where the size of the cluster is 2, since a user generally has a tendency to perform his/her intended operation more frequently, he/she may select the sensor pads having the maximum counted values, or give priority to upper or left sensor pads.

A drag operation mode to perform noise removal and fault tolerance according to another exemplary embodiment of the present invention is to cope with noise in consideration of a cluster maintaining time. In this exemplary embodiment, the cluster counts the on-time of the respective sensor pads, and if the counted value is smaller than a predetermined reference value, it recognizes this as a noise.

A drag operation mode to perform noise removal and fault tolerance according to still another exemplary embodiment of the present invention is to compare a positive edge and a negative edge of a cluster input signal with each other, which will be explained with reference to FIGS. 5A through 5C.

Figure 5A:
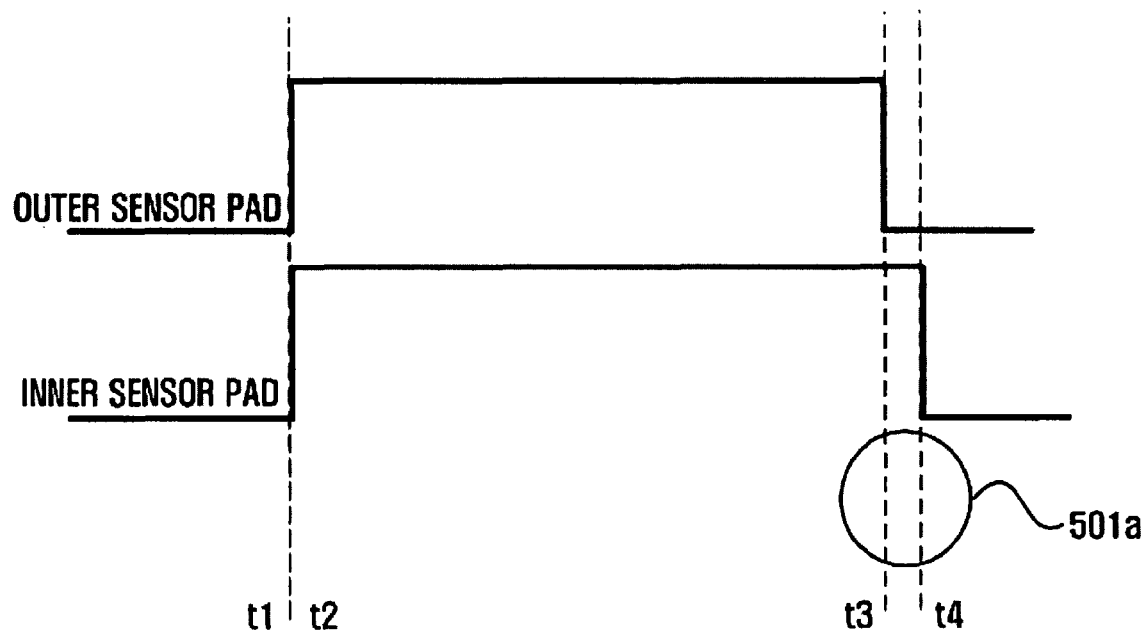
FIGS. 5A through 5C are views illustrating extended drag modes according to an exemplary embodiment of the present invention.
Figure 5B:
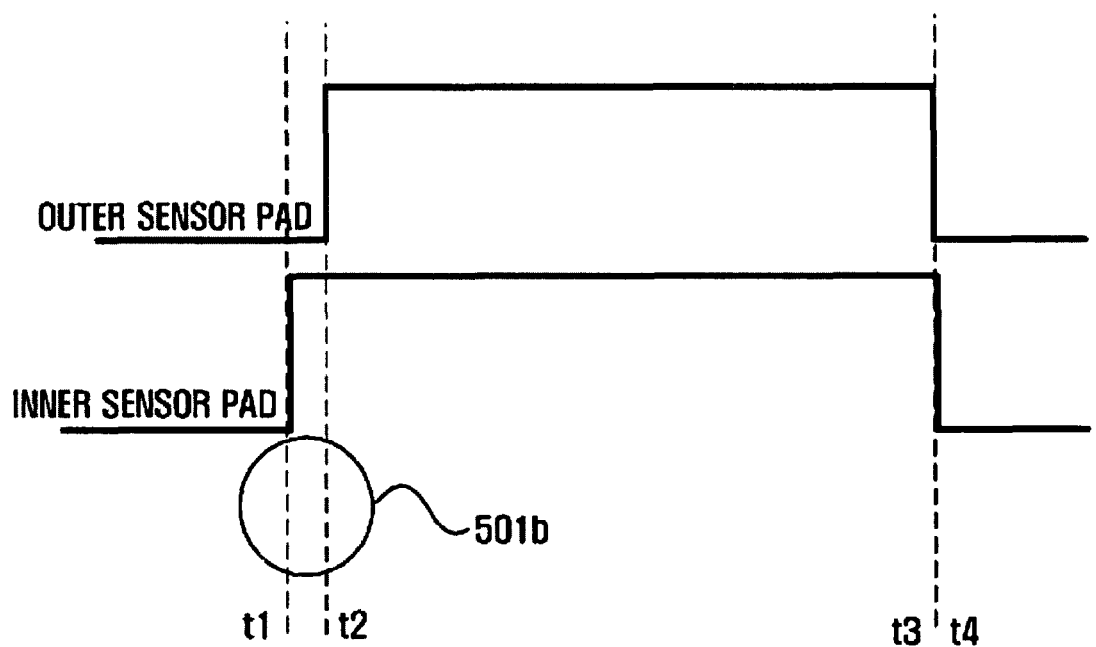
Figure 5C:
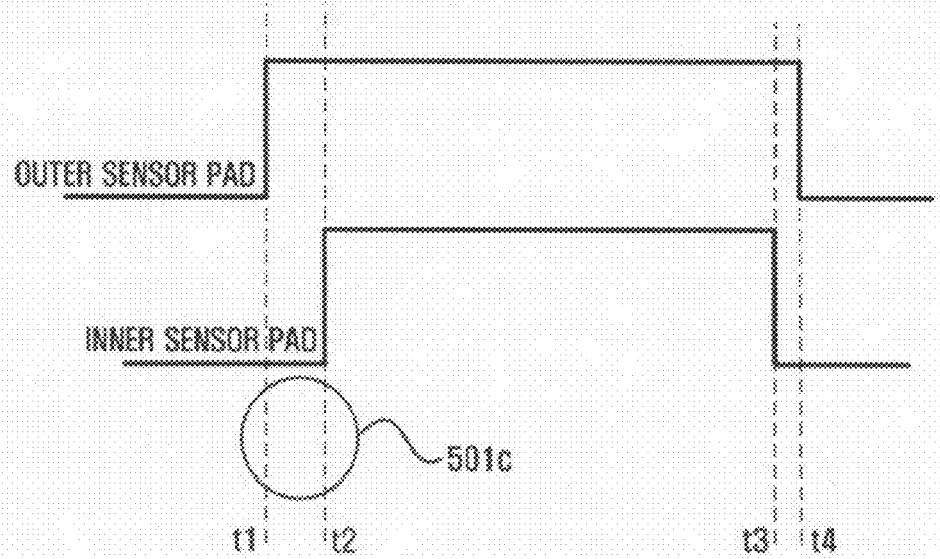

FIGS. 5A through 5C are views illustrating extended drag modes according to an exemplary embodiment of the present invention. If the positive edges of the outer sensor pad and the inner sensor pad coincide with each other as illustrated in FIG. 5A, it is judged using the remaining part 501*a* whether the present mode is the drag-in mode or the drag-out mode. If the negative edges of the outer sensor pad and the inner sensor pad coincide with each other as illustrated in FIG. 5B, it is judged using the remaining part 501*b* whether the present mode is the drag-in mode or the drag-out mode.

For example, a normal mode satisfies conditions of t2−t1>0(sec), t4−t3>0(sec).

If t4−t3>0, the present mode is judged as the drag-in mode by comparing the negative edges of the input signals (t4−t3>0) with each other even in the case where the outer sensor pad and the inner sensor pad start detection almost at the same time (t2−t1=0).

Also, if t2−t1>0, the present mode is judged as the drag-out mode by comparing the positive edges of the input signals (t2−t1>0) with each other even in the case where the outer sensor pad and the inner sensor pad start detection almost at the same time (t4−t3=0).

If the positive edge of the cluster input signal is opposite to the negative edge thereof as illustrated in FIG. 5C, a part 501*c* having a wider interval of time difference than the other part is selected to judge the present mode.

For example, if it is assumed that the minimum reference value of the time difference between the wide part and the narrow part is 0.02 sec, i.e., if the condition of (t2−t1)−(t4−t3)=0.02 sec is satisfied when t4−t3>0, t1−t2<0, the present mode is judged as the drag-in mode.

Although abnormal signals can be disregarded, the disregard of all the abnormal signals may lower the recognition rate. However, by using the method as described above, the recognition rate can be heightened.

Figure 6:
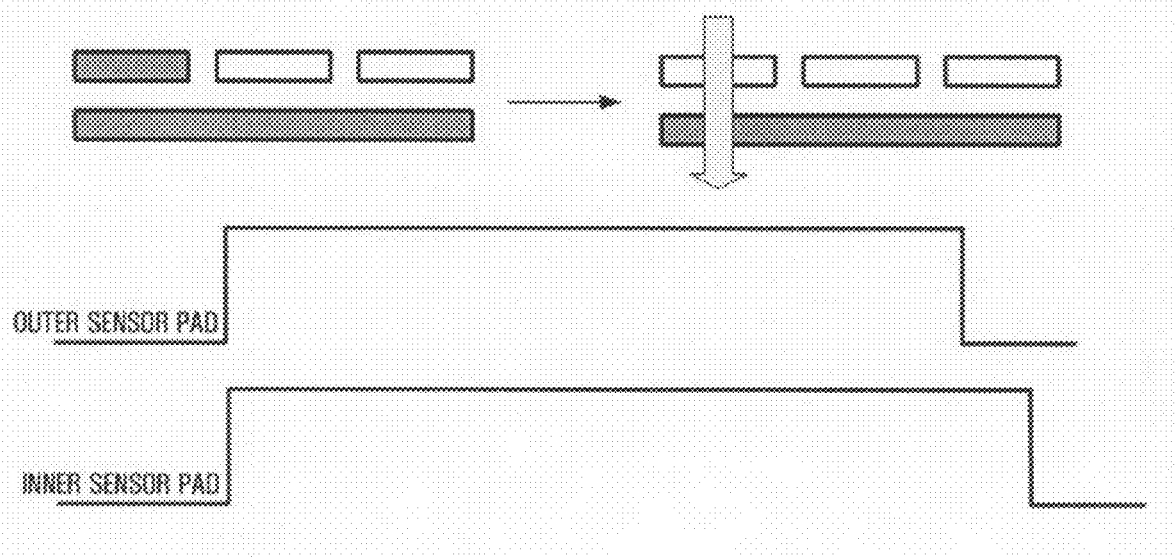
FIG. 6 is a view illustrating a long-touch drag mode according to an exemplary embodiment of the present invention.

FIG. 6 is a view illustrating a long-touch drag mode according to an exemplary embodiment of the present invention.

If the on-time of the outer sensor pad exceeds a predetermined reference time in a drag mode, the operation mode judgment unit 104 judges that the present mode is a long-touch drag mode.

For example, if the on-time of the outer sensor pad exceeds one second in a drag mode in a state that the reference time is set to one second, the operation mode judgment unit 103 judges the corresponding signal as the signal of the long-touch drag mode.

The successive drag-in/out modes can be judged from the time difference between the negative edges, and the noise removal and fault tolerance in the long-touch drag mode is the same as that in the drag mode.

Figure 7:
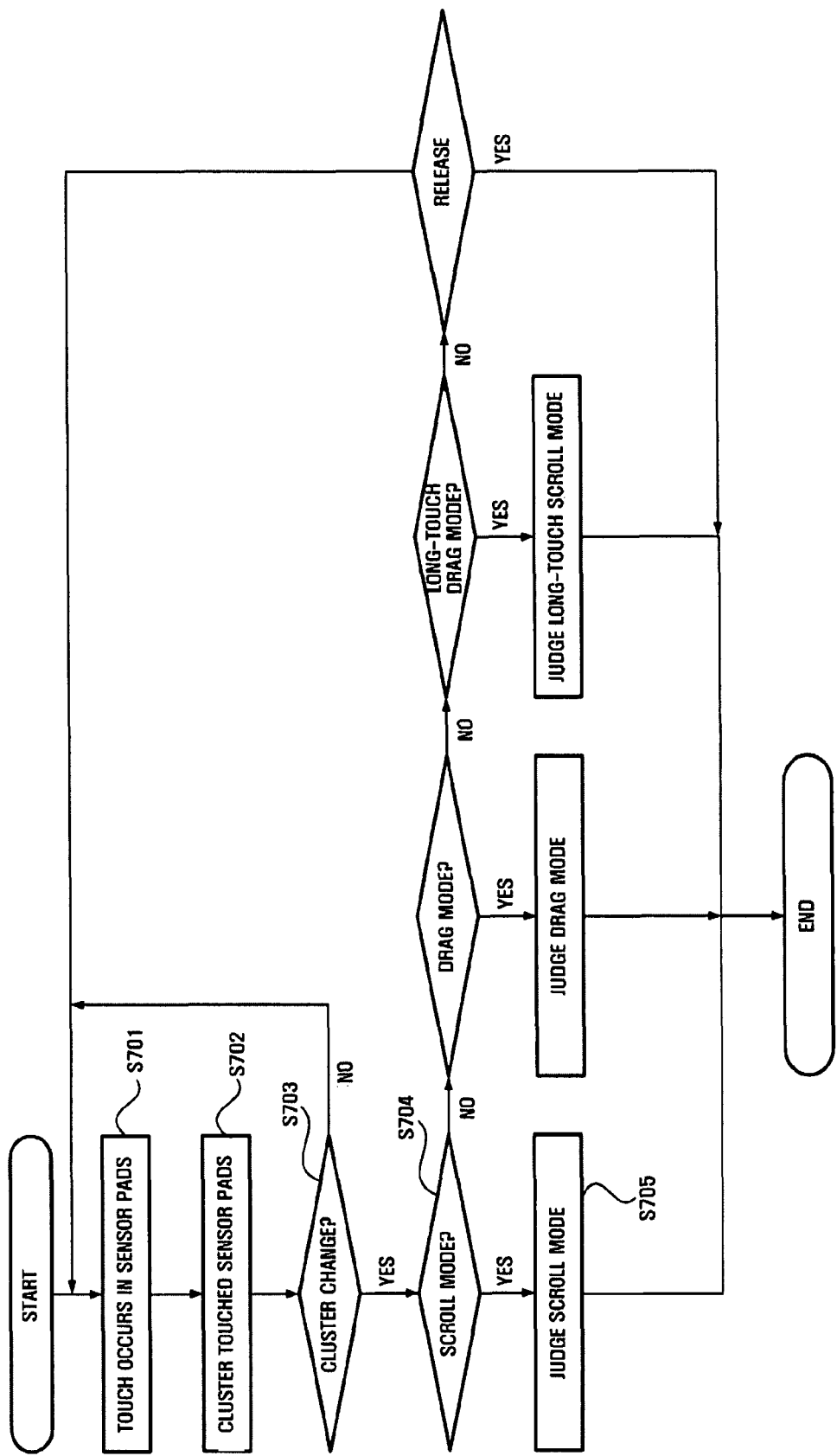
FIG. 7 is a flowchart illustrating a fault-tolerant method for a touch sensor according to an exemplary embodiment of the present invention.

FIG. 7 is a flowchart illustrating a fault-tolerant method for a touch sensor according to an exemplary embodiment of the present invention.

If there occurs a touch in a plurality of sensor pads 101 of the apparatus as illustrated in FIG. 2A, the clustering unit 102 clusters the touched sensor pad S702, and detects the change of the cluster through a signal inputted to the corresponding cluster S703.

After the step S703, the operation mode judgment unit 103 discriminates S704 and judges an operation mode to match the condition of the corresponding operation mode through the change of the cluster S705.

Preferably, the judgment of the operation mode is performed in the order of a scroll mode, a drag mode, and a long-touch drag mode, but is not limited thereto.

After the step S704, an operation intended by the user or a process approximating the operation intended by the user is performed through the noise removal and the fault tolerance according to the respective mode operations.

Figure 8:
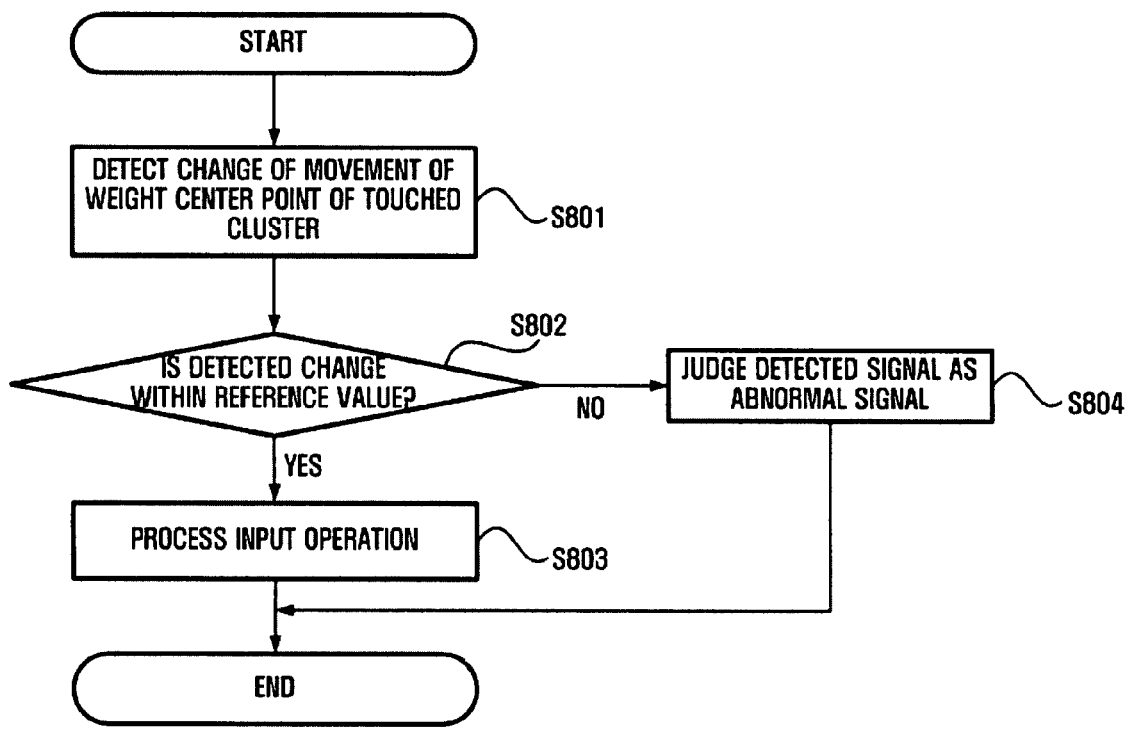
FIG. 8 is a flowchart illustrating a process of judging a scroll mode according to an exemplary embodiment of the present invention.

FIG. 8 is a flowchart illustrating a process of judging a scroll mode.

Referring to FIG. 8, the operation mode judgment unit 103 detects the movement of a weight center point of the touched cluster S801.

After the step S801, the operation mode judgment unit judges whether the detected signal value is in the range of the predetermined reference values (reference value range) S802, and if the detected signal is judged as a normal signal, the operation inputted through the signal based processing unit 104 is processed S803.

If the detected signal is judged as an abnormal signal S804, the judgment of the scroll mode is terminated.

Figure 9:
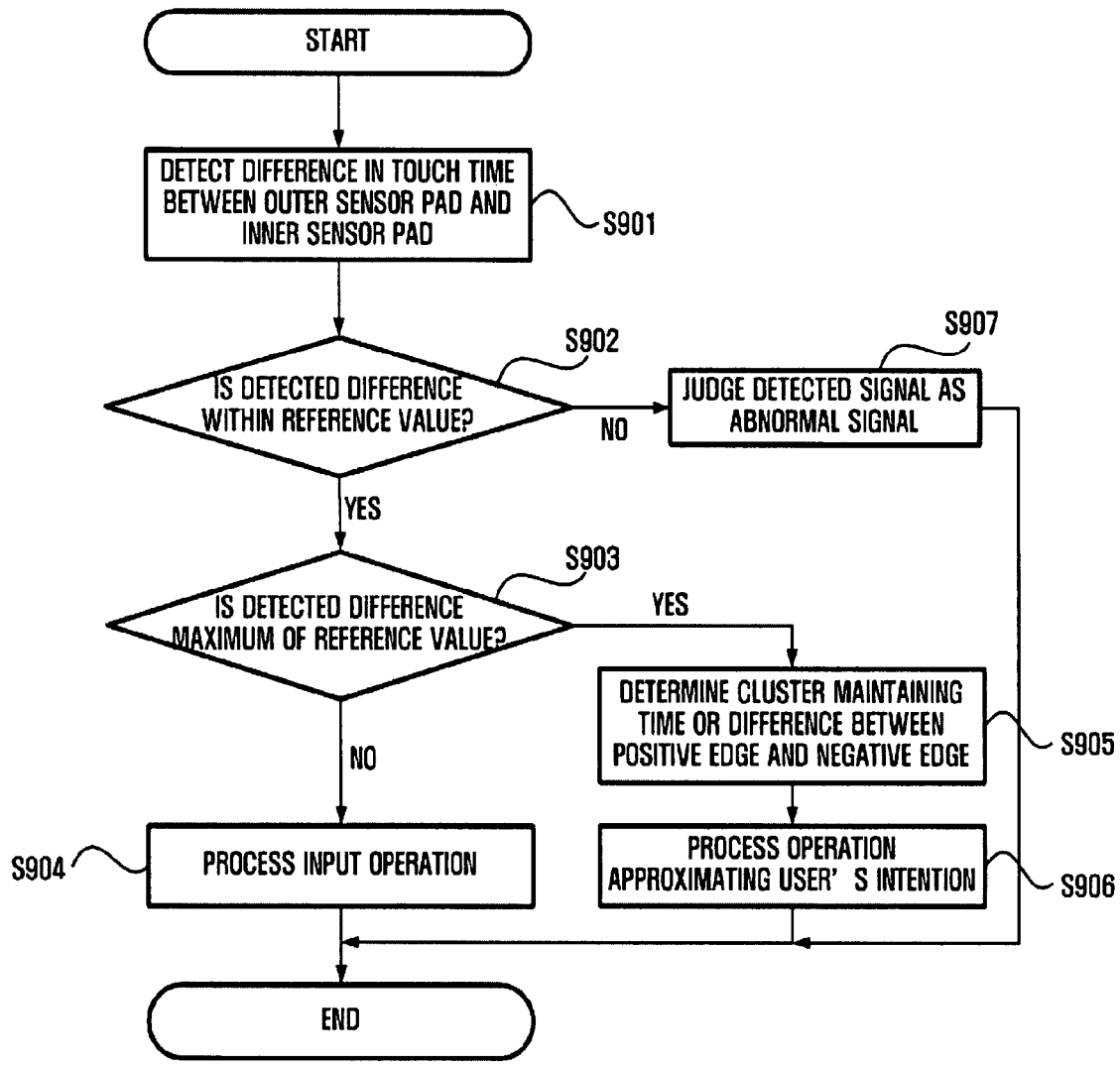
FIG. 9 is a flowchart illustrating a process of judging a drag mode according to an exemplary embodiment of the present invention.

FIG. 9 is a flowchart illustrating a process of judging a drag mode.

Referring to FIG. 9, the operation mode judgment unit 103 detects the difference in touch time between the touched outer sensor pad and the inner sensor pad S901.

After the step S901, the operation mode judgment unit judges whether the detected signal value is in the range of the predetermined reference values (reference value range) on the basis of the reference range of the cluster size S902. If the detected signal exists in the range of the reference values (reference value range) S902, the operation mode judgment unit judges whether the corresponding signal value is the maximum of the reference value range S903.

If the corresponding signal value is not the maximum of the reference value range as a result of judgment in the step S903, the operation intended by the user is processed through the signal based processing unit 104 S904. If the detected signal value corresponds to the maximum of the reference value range after the step S903, the cluster maintaining time or the difference between the positive edge and the negative edge is determined S905, and the result of determination is transferred to the signal based processing unit 104, so that an operation approximating the operation intended by the user can be processed S906.

If the detected signal value exceeds the reference value range in the step S902, the detected signal is judged as an abnormal signal, and the input operation is not performed S907.

Figure 10:
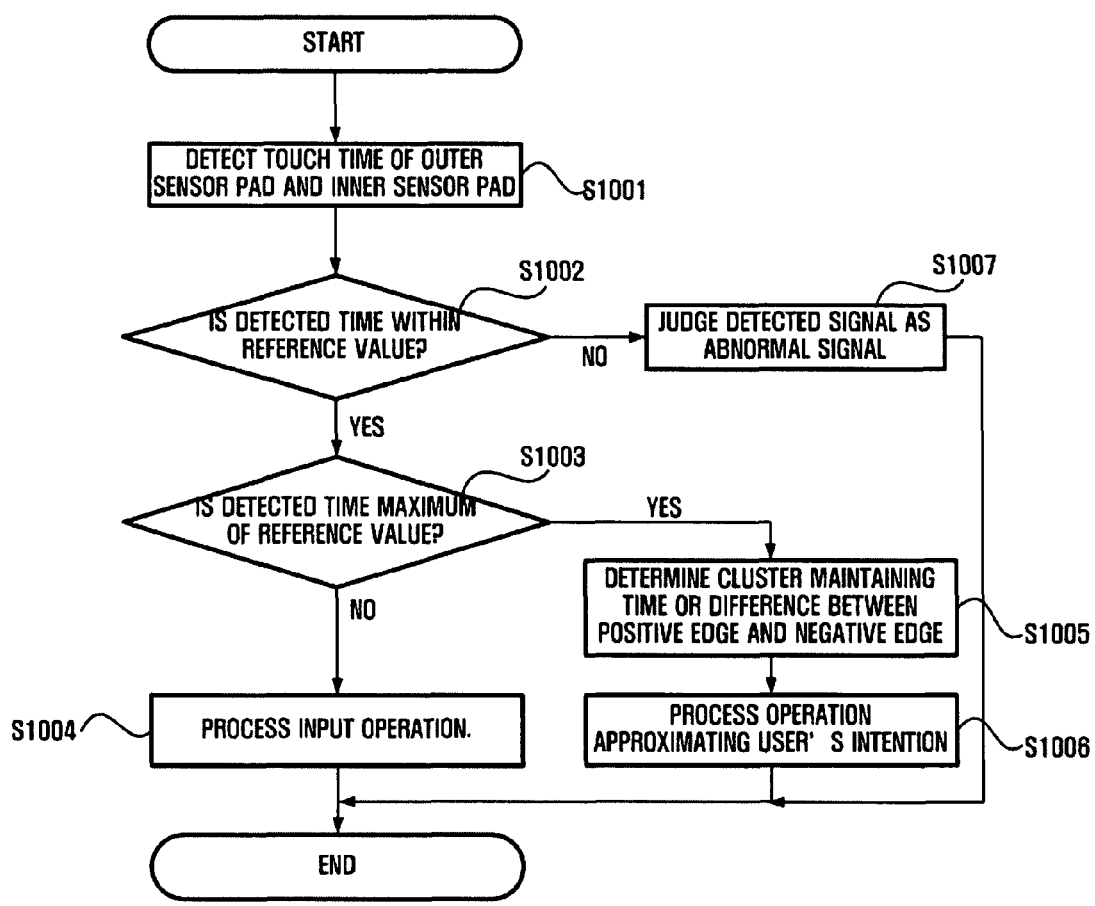
FIG. 10 is a flowchart illustrating a process of judging a long-touch drag mode according to an exemplary embodiment of the present invention.

FIG. 10 is a flowchart illustrating a process of judging a long-touch drag mode.

Referring to FIG. 10, the operation mode judgment unit 103 detects the touch time of the outer sensor pad and the inner sensor pad S1001.

After the step S1001, if the detected touch time exceeds a reference time, the operation mode judgment unit judges that the present mode is the long-touch drag mode, and then the same process as the drag mode in the steps S902 to S906 is performed.

Figure 11:
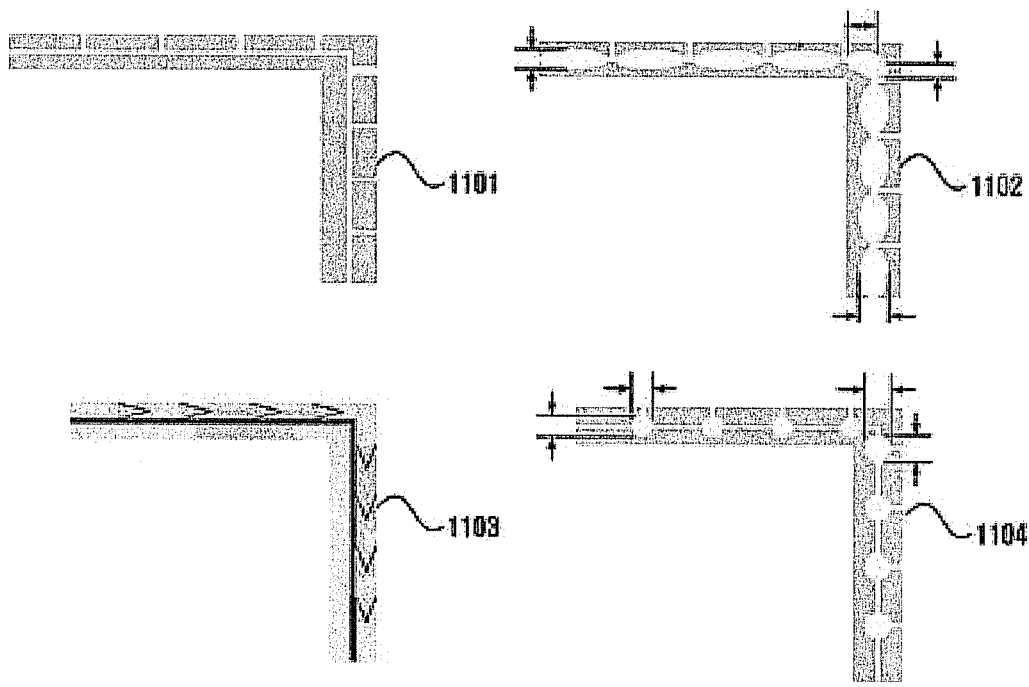
FIG. 11 is a view illustrating experimental results according to a sensor pattern and an optimum sensor pattern according to an exemplary embodiment of the present invention.

FIG. 11 is a view illustrating experimental results according to a sensor pattern and an optimum sensor pattern according to an exemplary embodiment of the present invention.

Referring to FIG. 11, the optimum pattern can secure a long time difference between the drag in and the drag out without signal attenuation in a scroll mode, in comparison to a typical rectangular type pattern.

In an exemplary embodiment of the present invention, the pattern 1102 showed the lowest failure rate in the experiment made in a state that the fault-tolerant algorithm was not applied.

The pattern has the effect of widening the interval between the sensor pads so that the positive edge and the negative edge of the input signal are secured to have similar characteristics in the case of an abnormal signal shown in the drag mode explained with reference to FIGS. 5A through 5C.

As described above, the fault-tolerant method, apparatus, and medium for a touch sensor according to the present invention has one or more of the following effects.

In judging the operation mode of the touch sensor, the influence of a signal noise can be minimized by maximizing the difference in detection time between adjacent sensor signals.

Also, in judging the operation mode of the touch sensor, an operation mode that approximates the user's intention can be extracted even in a signal region that does not belong to a normal operation mode.

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), and hardware storage devices (e.g., read only memory media, random access memory media, flash memories, etc.). The medium/media may also be a distributed network, so that the computer readable code/instructions are stored and executed in a distributed fashion. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module", as used herein, denotes, but is not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software component, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processors.

The computer readable code/instructions and computer readable medium/media may be those specially designed and constructed for the purposes of the present invention, or they may be of the kind well-known and available to those skilled in the art of computer hardware and/or computer software.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A fault-tolerant apparatus for a touch sensor, comprising:
   a plurality of sensor pads including outer sensor pads and an inner sensor pad to receive an input of operation signals, wherein the inner sensor pad is in parallel with the outer sensor pads;
   a clustering unit which detects signals by clustering the sensor pads according to the input signals; and
   an operation mode judgment unit which judges operation modes through the detected signals and which removes a signal noise and an inter-signal interference.

2. The apparatus of claim 1, wherein the outer sensor pads are arranged at a predetermined interval to receive the time differential operation signals in a horizontal direction.

3. The apparatus of claim 1, wherein the inner sensor pad is arranged at a predetermined interval from the outer sensor pads to receive the time differential operation signals in a vertical direction.

4. The apparatus of claim 1, wherein the operation mode judgment unit judges whether the detected signal is in a predetermined signal region.

5. The apparatus of claim 1, wherein the operation mode is any one of a scroll mode, a drag mode, and a long-touch drag mode.

6. The apparatus of claim 5, wherein the operation mode judgment unit detects the scroll mode by detecting movement of a weight center of the clustered sensor pads being touched.

7. The apparatus of claim 6, wherein the operation mode judgment unit removes a signal noise and an inter-signal interference of the scroll mode on the basis of a reference range of the movement of the weight center having predetermined maximum and minimum values.

8. The apparatus of claim 5, wherein the operation mode judgment unit detects the drag mode by detecting a difference in touch time between the outer sensor pad and the inner sensor pad.

9. The apparatus of claim 8, wherein the operation mode judgment unit removes a signal noise and an inter-signal interference of the drag mode on the basis of a reference range of a size of the clustered sensor pad having predetermined maximum and minimum values.

10. The apparatus of claim 5, wherein the operation mode judgment unit detects the long-touch drag mode by detecting an on-state of the output sensor pad and the inner sensor pad.

11. The apparatus of claim 10, wherein the operation mode judgment unit detects a signal noise and an inter-signal interference of the long-touch drag mode on the basis of a reference range of an on-state time having a predetermined minimum value.

12. The apparatus of claim 1, wherein the operation mode judgment unit detects the operation mode by compensating for the inter-signal interference even if an abnormal signal, which does not belong to the operation mode, is detected.

13. A fault-tolerant method for a touch sensor, comprising:
 (a) receiving input signals from a plurality of sensor pads including outer sensor pads and an inner sensor pad, wherein the inner sensor pad is in parallel with the outer sensor pads;
 (b) detecting signals by clustering the sensor pads according to the input signals; and
 (c) judging operation modes through the detected signals and removing a signal noise and an inter-signal interference.

14. The method of claim 13, wherein judging operation modes comprises discriminating among a scroll mode, a drag mode, a drag mode and a long-touch drag mode.

15. The method of claim 14, wherein judging operation modes detects the scroll mode by detecting movement of a weight center of the clustered sensor pads being touched.

16. The method of claim 15, wherein judging operation modes removes a signal noise and an inter-signal interference of the scroll mode on the basis of a reference range of the movement of the weight center having predetermined maximum and minimum values.

17. The method of claim 14, wherein judging operation modes detects the drag mode by detecting a difference in touch time between the outer sensor pad and the inner sensor pad.

18. The method of claim 17, wherein judging operation modes removes a signal noise and an inter-signal interference of the drag mode on the basis of a reference range of a size of the clustered sensor pad having predetermined maximum and minimum values.

19. The method of claim 14, wherein judging operation modes detects the long-touch drag mode by detecting an on-state of the output sensor pad and the inner sensor pad.

20. The method of claim 19, wherein judging operation modes detects a signal noise and an inter-signal interference of the long-touch drag mode on the basis of a reference range of an on-state time having a predetermined minimum value.

21. The method of claim 13, wherein judging operation modes detects the operation mode by compensating for the inter-signal interference even if an abnormal signal, which does not belong to the operation mode, is detected.

22. At least one nontransitory computer readable medium storing computer readable instructions that control at least one processor to implement the method of claim 13.

23. A fault-tolerant apparatus for a touch sensor, comprising:
 a clustering unit which detects signals by clustering the sensor pads according to time differential operation signals input through sensor pads; and
 an operation mode judgment unit which judges operation modes through the detected signals and which removes a signal noise and an inter-signal interference from the detected signals,
 wherein the sensor pads include outer sensor pads and an inner sensor pad, wherein the inner sensor pad is in parallel with the outer sensor pads.

24. A fault-tolerant method for a touch sensor, comprising:
 detecting signals by clustering the sensor pads according to time differential operation signals input through sensor pads; and
 judging operation modes through the detected signals and removing a signal noise and an inter-signal interference from the detected signals,
 wherein the sensor pads include outer sensor pads and an inner sensor pad, wherein the inner sensor pad is in parallel with the outer sensor pads.

25. At least one nontransitory computer readable medium storing computer readable instructions that control at least one processor to implement the method of claim 24.

* * * * *

UNITED STATES PATENT AND TRADEMARK OFFICE
CERTIFICATE OF CORRECTION

| | | |
|---|---|---|
| PATENT NO. | : 7,982,719 B2 | Page 1 of 1 |
| APPLICATION NO. | : 11/802410 | |
| DATED | : July 19, 2011 | |
| INVENTOR(S) | : Cho et al. | |

It is certified that error appears in the above-identified patent and that said Letters Patent is hereby corrected as shown below:

Column 11, Line 23, In Claim 14, delete "a drag mode and" and insert -- and --, therefor.

Signed and Sealed this
Fifth Day of June, 2012

David J. Kappos
*Director of the United States Patent and Trademark Office*